United States Patent
Devarayanigari et al.

(10) Patent No.: US 9,565,598 B2
(45) Date of Patent: Feb. 7, 2017

(54) METHOD AND SYSTEM TO REDUCE DELAY IN CIRCUIT SWITCH FALLBACK (CSFB) PROCEDURES WHILE OPERATING WITH MULTI/DUAL SIMS

(71) Applicant: Samsung Electronics Co., Ltd., Gyeonggi-do (KR)

(72) Inventors: Pavan Kumar Devarayanigari, Bangalore (IN); Akshay Rastogi, Bangalore (IN); Nitesh Pushpak Shah, Bangalore (IN); Prasad Basavaraj Dandra, Bangalore (IN); Vijay Ganesh Surisetty, Bangalore (IN)

(73) Assignee: Samsung Electronics Co., Ltd (KR)

( * ) Notice: Subject to any disclaimer, the term of this patent is extended or adjusted under 35 U.S.C. 154(b) by 50 days.

(21) Appl. No.: 14/730,971

(22) Filed: Jun. 4, 2015

(65) Prior Publication Data

US 2015/0358862 A1 Dec. 10, 2015

(30) Foreign Application Priority Data

Jun. 4, 2014 (IN) .......................... 2748/CHE/2014

(51) Int. Cl.
*H04W 36/00* (2009.01)
*H04W 60/00* (2009.01)

(52) U.S. Cl.
CPC ....... *H04W 36/0022* (2013.01); *H04W 60/005* (2013.01); *Y02B 60/50* (2013.01)

(58) Field of Classification Search
None
See application file for complete search history.

(56) References Cited

U.S. PATENT DOCUMENTS

| 9,313,729 B2* | 4/2016 | Dahlen | H04W 48/18 |
| 2012/0218889 A1* | 8/2012 | Watfa | H04W 60/04 |
| | | | 370/230 |
| 2012/0302234 A1* | 11/2012 | Wallis | H04W 36/0022 |
| | | | 455/433 |
| 2013/0044709 A1* | 2/2013 | Adjakple | H04W 76/025 |
| | | | 370/329 |

* cited by examiner

*Primary Examiner* — Hong Cho
(74) *Attorney, Agent, or Firm* — The Farrell Law Firm, P.C.

(57) ABSTRACT

A method of reducing delay in Circuit Switched FallBack (CSFB) in a Radio Access Technology (RAT) communications network. The method includes initiating, by a terminal, a combined attach procedure by sending an attach request message to the RAT communications network, receiving, by the terminal, an attach accept message along with Location Area Identification (LAI) information from the network in response to the attach request message, checking, by the terminal, network identifier information in a RAT information table based on the received LAI, and selecting a mobile network based on the network identifier information to trigger establishment of a circuit-switched call.

19 Claims, 5 Drawing Sheets

| Sl NO | LAI ID | SIM No | RAT ID |
|---|---|---|---|
| 1 | 310 380 00 01 | 1 | 2G |
| 2 | 310 410 00 01 | 2 | 3G |
| 3 | 310 380 00 02 | 1 | 2G |
| 4 | 310 410 00 02 | 4 | 3G |
| 5 | 310 330 00 01 | 2 | 2G |
| 6 | 310 330 00 02 | 3 | 3G |
| 7 | 310 330 00 01 | 4 | 2G |

METHOD AND SYSTEM TO REDUCE DELAY IN CIRCUIT SWITCH FALLBACK (CSFB) PROCEDURES WHILE OPERATING WITH MULTI/DUAL SIMS

PRIORITY

This application claims priority under 35 U.S.C. §119(a) to an Indian Provisional patent application filed on Jun. 4, 2014 in the Indian Intellectual Property Office and assigned Serial No. 2748/CHE/2014, the entire content of which is incorporated herein by reference.

BACKGROUND

1. Field of Disclosure

The present disclosure relates generally to wireless communication, and more particularly, to an apparatus and method to reduce delay of Circuit Switched FallBack (CSFB) (voice) Call while operating with Multi/Dual SIMs.

2. Description of the Related Art

Long-Term Evolution (LTE) is a technology proposed by the 3$^{rd}$ Generation Partnership Project (3GPP) which supports high data rate (e.g., 50 Mbps UpLink (UL) and 100 Mbps DownLink (DL)) and is a packet switched system. In a 3GPP based 3G/LTE system, during a combined registration procedure on LTE, a Mobility Management Entity (MME) coordinates with a Mobile Switching Center (MSC) configured to that MME and provides the Location Area Identified (LAI) and Temporary Mobile Subscriber Identity (TMSI) to connect a Circuit Switched (CS) domain directly in a GSM (Global System for Mobile communication) Edge Radio Access Network/Universal Terrestrial Radio Access Network (GERAN/UTRAN) without registration. In the case where a User Equipment (UE) is in LTE and a Mobile Originated/Mobile Terminated (MO/MT) Call is triggered, the UE initiates an Extended Service Request Procedure. As a response to this procedure, the network will trigger a Redirection Request based on the MSC to which it is connected and the LAI information it has provided in an Attach/Tracking Area Update (TAU) Accept message.

However, if the UE is in LTE and an MO/MT Call is initiated, the Extended Service Request Procedure can fail because of one or more of, but not limited to, a lower layer failure, network congestion, a connection failure, and the like. According to current specifications, and the nature of a packet switched system, only burst data is processed by the UE. In order to support a voice call in a multimode device capable of LTE/3G/2G, 3GPP has developed the CS Fallback mechanism to fall back to 2G or 3G for a voice call, wherein a CS Fallback supported UE should switch to GERAN/UTRAN and proceed with the Mobility management (MM) and General Packet Radio Service (GPRS) MM (GMM) specific procedures.

When a user attempts to make a normal/emergency call, and when the UE is on an Evolved UTRAN (EUTRAN) network, a CSFB Call Request may fail because of various reasons, such as, but not limited to, temporary causes like MSC Not Reachable, network congestion, temporary radio related problems (like random access failure, Radio Resource Control (RRC) connection failure) or permanent causes (CS domain not available), and any other causes as mentioned in the 3GPP specification. The main problem is selecting the right Radio Access Technology (RAT). In EUTRA, an Attach Accept network provides only LAI information but does not provide any RAT information where the provided LAI is valid. In this case, the UE may select a High Priority RAT based on Subscriber Identity Module (SIM) Home Public Land Mobile Network (HPLMN) files and proceeds with the same RAT. If it is not present in the SIM, the UE may select the RAT randomly and proceed with a Public Land Mobile Network (PLMN) scan. In this case, if the UE selects an incorrect RAT, the call might be delayed significantly.

FIG. 1 is a flow diagram 100 illustrating a procedure between a network and a UE during an Extended Service Request (ESR) failure for a CS call, according to the related art.

Referring to FIG. 1, the network transmits an Evolved Packet System (EPS) Attach Accept message to the UE along with LAI information, wherein the LAI information comprises location and area details of the network. Upon receiving the EPS Attach Accept message, the UE can initiate a Mobile Originated (MO) voice call. While initiating the MO voice call, the UE can transmit an Extended Service request (ESR) to the network for making the voice call.

The network can experience a lower layer failure and thus can send a RRC Connection Release message to the UE, and thereby the UE stops the voice call. Upon receiving the RRC Connection Release message, the UE determines that the RAT providing the GERAN/UTAN has a lower layer failure problem and must switch to another RAT for network access. As the UE does not have any other secondary RAT to rely on, the UE randomly searches for a GERAN/UTRAN RAT to camp on. The UE can initiate a PLMN scan on a selected RAT to identify a suitable RAT to camp on. Scanning and searching for a suitable RAT can be a time consuming process and until a RAT is identified, the UE will be without any RAT to camp on. Once the UE identifies a suitable RAT, the UE sends a Cubic Metric (CM) service request to the selected RAT. According to the present procedure, the UE does not have any specific information regarding which RAT is to be selected, and the selection is done randomly.

FIG. 2 is a schematic flow diagram 200 illustrating a procedure between a network and a UE, wherein the lack of RAT information causes delay in RAT selection, according to the related art.

Referring to FIG. 2, the network transmits an EPS Attach Accept message to the UE along with LAI information, wherein the LAI information comprises of location and area details of the network. Upon receiving the EPS Attach Accept message, the UE can initiate a MO voice call. While initiating the MO voice call, the UE can transmit an ESR to the network for making the voice call.

The network can experience a lower layer failure and thus sends a RRC Connection Release message to the UE, and thereby the UE stops the voice call. Upon receiving the RRC Connection release message, the UE can determine that the RAT providing the GERAN/UTAN has a lower layer failure problem and must switch to another RAT for network access. As the UE does not have any other secondary RAT to rely on, the UE randomly searches for a GERAN/UTRAN RAT to camp on. The UE can initiate a PLMN scan on a UTRAN to identify a suitable RAT to camp on. The network responds to the UE with a message indicating that the UTRAN is not available for switching, and the UE can switch to any of the 2G networks for accessing the network. The UE can initiate scanning on a GERAN upon receiving the message from the network. The process of scanning for the UTRAN, receiving the message from the network, and initiating the scanning of a GERAN can cause delay in identifying a suitable RAT. Once the UE identifies a suitable RAT, the UE sends a CM service request to the selected RAT. According to the present procedure, after ESR procedures fails due to a lower layer failure, the UE selects the 3G RAT, but the network can be configured with only LTE and 2G networks. So a long delay can be experienced before the call is established.

So, in case of temporary or radio failure causes according to the 3GPP specification (e.g. 3GPP 24.301 TS), it is mentioned that the UE should move to a GERAN/UTRAN. Currently, there is no method to identify to which RAT a UE should move in case of a voice call pending, while the UE was on LTE. Therefore, maintaining the mapped LAI, SIM and RAT information when the UE successfully performs registration using one SIM will help the other SIMs to camp on to a cell immediately and process the CS call without a long delay.

Thus, there is a need for a system and method that can obtain RAT related information on a UE side locally using the CSFB call success information when a call is triggered on one SIM to overcome the problems discussed herein above.

SUMMARY

The present disclosure has been made to address at least the problems and/or disadvantages described above and to provide at least the advantages described below.

Accordingly, an aspect of the present disclosure provides an improved apparatus and method for reducing delay in Circuit Switched FallBack (CSFB) procedures while operating with multi/dual SIMS.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1:
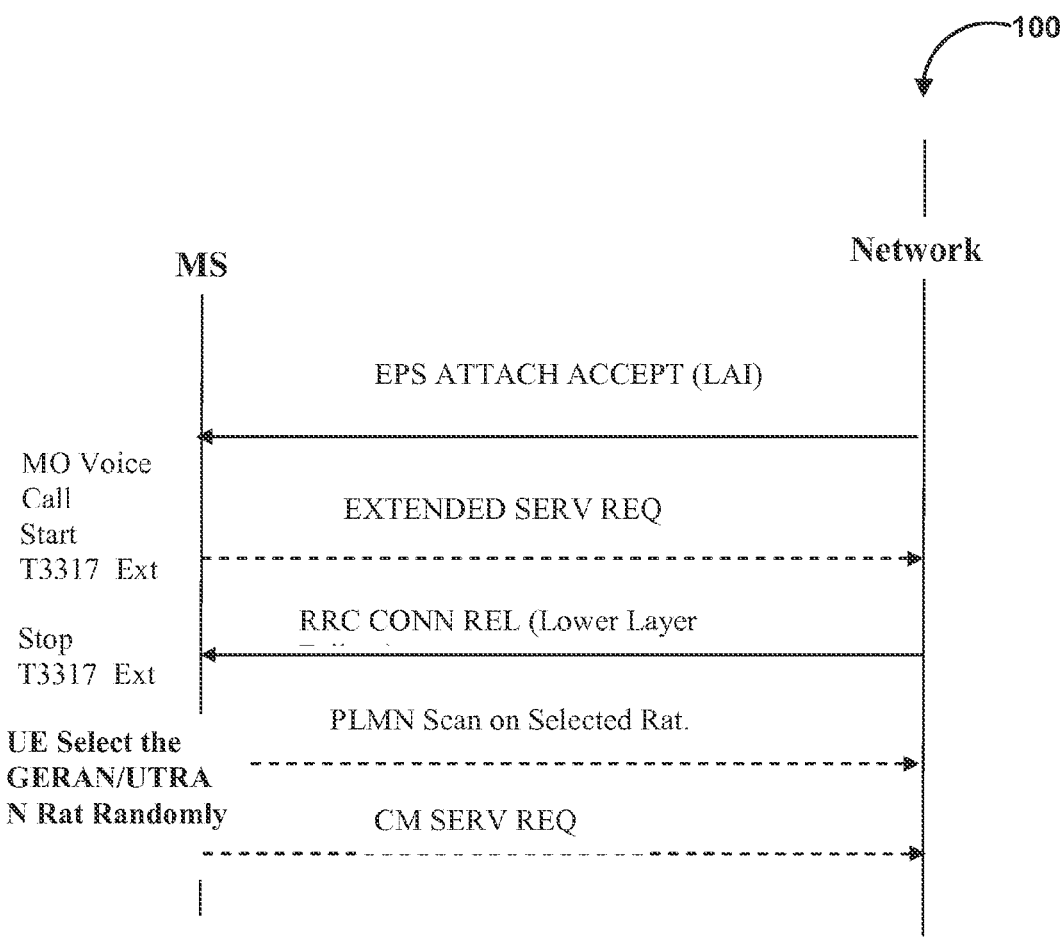
FIG. 1 is a flow diagram illustrating a procedure between a network and a UE during an ESR failure for a CS call, according to the related art.
Figure 2:
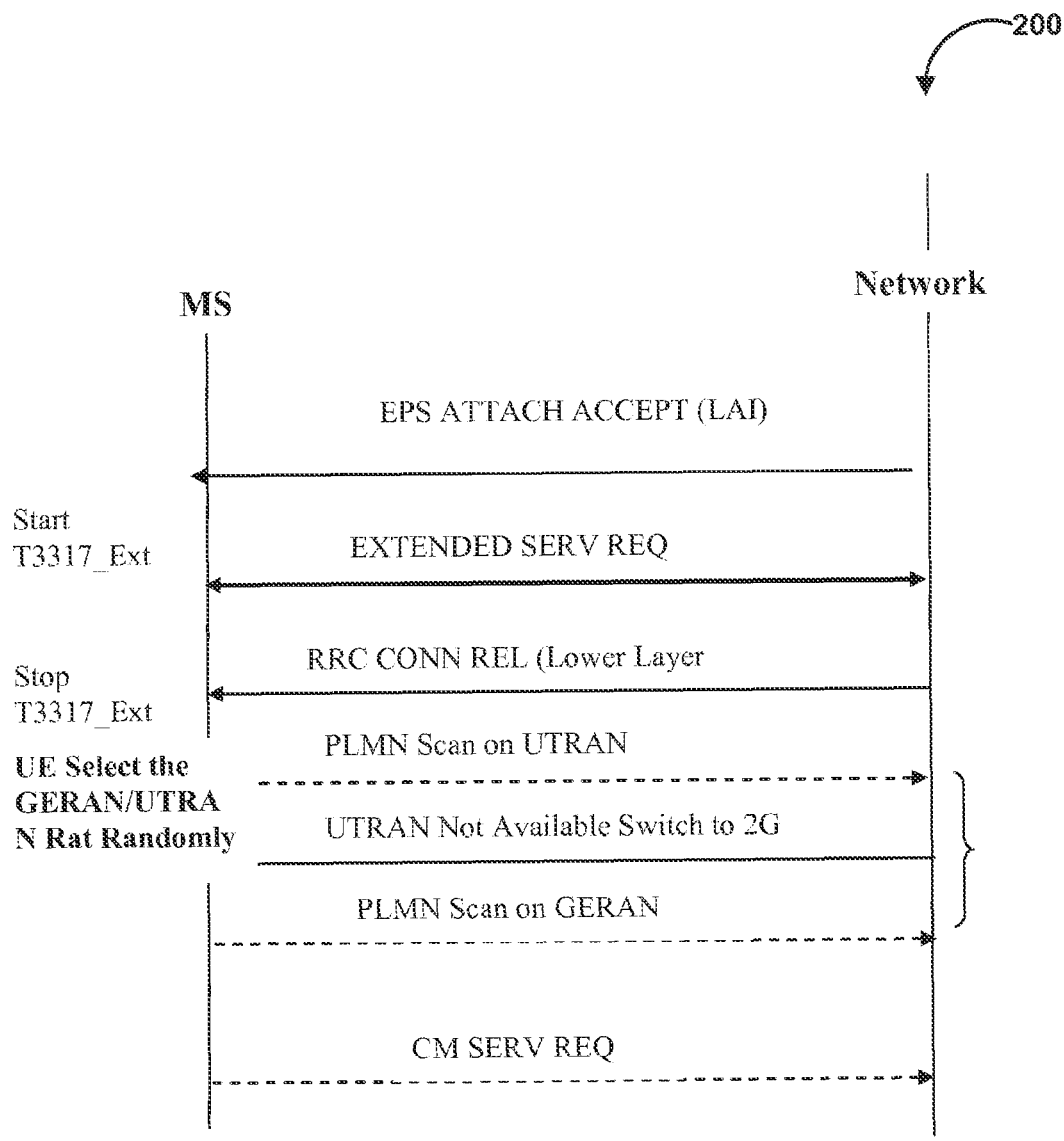
FIG. 2 is a flow diagram illustrating a procedure between a network and a UE, wherein a lack of RAT information causes a delay in RAT selection, according to the related art.

Various embodiments of the present disclosure provide a method and system to reduce delay of CSFB (voice) call while operating with Multi/Dual SIMs. In the following detailed description, reference is made to the accompanying drawings that form a part hereof, and in which are shown by way of illustration certain embodiments in which the disclosure may be practiced. These embodiments are described in sufficient detail to enable those skilled in the art to practice the disclosure, and it is to be understood that other embodiments may be utilized and that changes may be made without departing from the scope and spirit of the present disclosure. The following detailed description is, therefore, not to be taken in a limiting sense, and the scope of the present disclosure is defined only by the appended claims and any equivalents thereof.

Further, although certain features of the present disclosure are illustrated in some drawings and not in others. This is done for convenience only as each feature may be combined with any or all of the other features in accordance with the present disclosure.

The specification may refer to "an," "one," or "some" embodiment(s) in several locations, which does not necessarily imply that each such reference is to the same embodiment(s), or that the feature only applies to a single embodiment. Single features of different embodiments may also be combined to provide other embodiments.

As used herein, the singular forms "a," "an," and "the" are intended to include the plural forms as well, unless expressly stated otherwise. It will be further understood that the terms "includes," "comprises," "including," and/or "comprising" when used in the present disclosure, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which the present disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with an aspect of the present disclosure, a method is provided for reducing delay in Circuit Switch Fall Back (CSFB) in a radio access technology (RAT) communications network. The method includes of a User Equipment (UE) initiating a combined attach procedure by sending an attach request message to the network, the UE receiving an attach accept message along with a Location Area Identification (LAI) information from the network in response the attach request message, the UE checking a network identifier information in a RAT information table based on the received LAI, wherein the RAT Information table comprises of location area identification (LAI) value, SIM information, and RAT information, wherein the RAT information is based on the 2G/3G information and wherein the network identifier information comprises at least one of a mobile network operator information, and a LAI corresponding to the preferred mobile network, and selecting a mobile network based on the network identifier information to trigger establishment of a circuit-switched call connection if extended service request (ESR) procedure is failed in LTE Network.

In accordance with an aspect of the present disclosure, the method further comprises of the UE updating the RAT information table with a LAI information and RAT information when a CSFB call is successful on the selected mobile network. The RAT information table can be accessed by one or more of the SIMs in the UE corresponding to one or more mobile network operators. According to an embodiment of the present invention, the UE selects the at least one mobile network during at least one of, but not limited to, a CSFB call initiation, a network failure, improved network service, and the like.

In accordance with an aspect of the present disclosure, a User equipment (UE) is provided for reducing delay in in Circuit Switch Fall Back (CSFB) in a radio access technology (RAT) communications network. The UE comprises at least one module adapted for initiating a combined attach procedure by sending an attach request message to a network, receiving an attach accept message along with a Location Area Identification (LAI) information from the network in response the attach request message, checking a network identifier information in a RAT information table based on the received LAI, wherein the RAT Information table comprises of location area identification (LAI) value, SIM information, and RAT information, wherein the RAT information is based on the 2G/3G information and wherein the network identifier information comprises at least one of a mobile network operator information, and selecting a mobile network based on the network identifier information to trigger establishment of a circuit-switched call connection if ESR procedure is failed in LTE Network.

The various embodiments herein provide methods for reducing a delay of Circuit Switched FallBack (CSFB) (voice) call while operating with Multi/Dual Subscriber Identity Modules (SIMs). The embodiments herein provide a method that depicts a User Equipment (UE) maintaining and updating a table that comprises of plurality of information, which is accessed by the UE to select a suitable RAT for connection before initiating a CSFB call, and thereby reducing delay for a voice call.

Cells that support Semi-Persistent Scheduling/Cell Discontinuous Reception (SPS/CDRX) and camping over to the selected cells to reduce power during a data call, wherein the cell selected for camping to reduce power consumption of the UE can be selected from a plurality of cells, which are either neighbors or overlap with each other.

Figure 3:
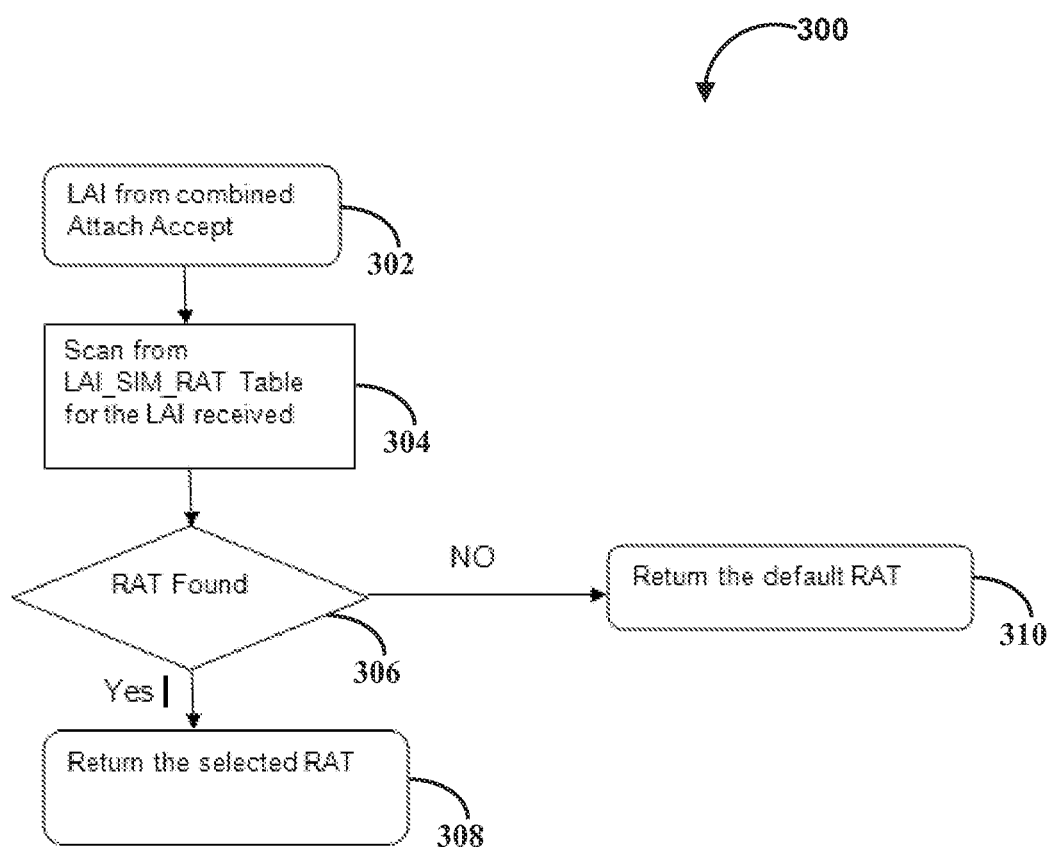
FIG. 3 is a flowchart of a method of reducing delay in CSFB procedures, according to an embodiment of the present disclosure.

FIG. 3 is a flowchart of a method of reducing a delay in CSFB procedures, according to an embodiment of the present disclosure.

Referring to FIG. 3, the method illustrates sharing of messages and signals between a UE and a network for selecting a suitable RAT to camp on, such that the delay for selecting the suitable RAT can be reduced, thereby allowing the UE to access network features at the earliest time. The present disclosure illustrates reducing delay during CSFB procedures for dual/multiple SIM UEs, wherein the UE can be one of, but is not limited to, a mobile phone, a tablet Personal Computer (PC), a Personal Digital Assistant (PDA), and the like.

In step 302, the UE initiates a combined attach procedure by sending an attach request message to a network. When the UE wishes to initiate the CSFB procedures while in connection with an LTE (e.g. 4G) network, according to the current 3GPP standards, the UE must switch back to either a 2G or a 3G network, as the LTE network cannot support CSFB procedures. Therefore, the UE sends the attach request message to the currently camped network.

In step 304, the UE receives an attach accept message along with Location Area Identification (LAI) information from the network in response to the attach request message. The network receives the attach request message from the UE and identifies that the UE wishes to switch to another mobile network. The network can approve the UE's request by sending an attach accept message. The UE receives the attach accept message from the network along with the LAI information, wherein the LAI information can include a location and area identification value of the respective network.

In step 306, the UE checks for network identifier information in a RAT information table based on the received LAI. The UE maintains a RAT information table that comprises, but is not limited to, location area identification (LAI) values, SIM information that includes the LAI values related to which SIM of the UE, RAT information, and the like, wherein the RAT information is based on 2G or 3G information. The UE accesses the RAT information table upon receiving the attach accept request and checks for network identifier information, wherein the network identifier information can comprise at least one of, but is not limited to, mobile network operator information, and the LAI corresponding to the preferred mobile network.

In step 308, the UE selects a mobile network based on the network identifier information to trigger establishment of a circuit-switched call connection. Upon checking the network identifier information, the UE identifies the best network among all available networks in the RAT table. The UE selects the network and sends a connection initiation message to the network to camp on it for establishing a Circuit-Switched (CS) call connection, wherein the CS call connection is established for a CS call initiation. In an embodiment of the present disclosure, the UE selects the best suitable network among the available networks by triggering an establishment of a CS call connection because, but is not limited to, a network failure, to access improved network service, and the like. A person having ordinarily skill in the art can understand that the UE can select another network among available networks present in the RAT table for establishing a CS call connection without departing from the scope of the disclosure.

The network selected from the available networks present in the RAT table can be either a 2G network or a 3G network, which the user can use to initiate a CS voice call with another UE. Upon a successful connection establishment with a 2G/3G network, the UE can initiate a voice call and can also use other features by camping on the 2G or 3G network. Upon a successful connection establishment and a CS voice call, the UE can update the RAT information table with LAI information and RAT information when a CSFB call is successful on the selected mobile network, such that the updated information can be used by any of the SIMs of the UE in a future CS call connection establishment process.

In an embodiment of the present disclosure, if the UE fails to identify the best suitable mobile network based on the network identifier information, the UE can select a default network in 2G or 3G using an existing procedure, such that the UE can access the default 2G/3G network for establishing a CS call connection. The UE can update the RAT information table with the LAI information and the RAT information when a CSFB call is not successful on the selected mobile network, such that the updated information can be used by any of the SIMs of the UE in a future CS call connection establishment process and avoid selecting the particular mobile network.

In an embodiment of the present disclosure, if the UE fails to identify the best suitable mobile network based on the network identifier information, the UE can select any of the available networks in 2G/3G using an existing procedure, such that the UE can access the 2G/3G network for establishing a CS call connection.

According to an embodiment of the present disclosure, a UE is camped on an LTE network and is thus using only a Packet-Switched (PS) connection. If the UE wishes to establish a Circuit-Switched (CS) connection to make a Mobile Oriented (MO) voice call, as MO call is not possible over a PS connection of an LTE network. Thus, the UE sends an Attach request message to the LTE network requesting a CSFB voice call and to release it from the network. In an embodiment of the present invention, the UE can send the Attach request message to the network during one of, but is not limited to, a network failure, the availability of an improved network service providing network, and the like.

The network receives the request and identifies that the UE wishes to make a CS voice call. The network sends an Attach Accept message to the UE. The UE receives the Attach Accept message from the network along with LAI information. The UE identifies the LAI information and searches for the same in the RAT information table present in the UE. The UE identifies the 2G/3G networks with the matching LAI information in the RAT information table and identifies a best suitable network for connecting to the identified best suitable network. Upon identifying the best suitable network, the UE attempts to establish a connection with the selected network by sending a request to the selected network.

Once the network accepts the connection request, the UE can camp on the selected network and establish a CSFB voice call with another UE. If the network rejects the request, then the UE can establish a connection with a default network selected by the LTE network. In an embodiment of the present disclosure, the UE can establish a connection with any other suitable network present in the RAT information table, upon the selected network rejecting the request from the UE.

The RAT information table can be updated by the UE upon each attempt made to establish a connection with a mobile network irrespective of success or failure of the connection establishment.

Figure 4:
FIG. 4 is a table of RAT information including LAI information and RAT information required for a UE to select a suitable network, according to an embodiment of the present disclosure.

FIG. 4 is a table of RAT information including LAI information and RAT information required for a UE to select a suitable network, according to an embodiment of the present disclosure.

Referring to FIG. 4, the RAT Information table 400 includes information such as LAI Identification (ID), SIM number, and RAT ID. In an embodiment of the present disclosure, the RAT information table 400 can also include other information, such as, but is not limited to, a suggestion whether to connect to a network or not, a current load on a network, the previous status of a connection, and the like. LAI ID information illustrates the location area identification value assigned to the respective mobile network. SIM number information illustrates which SIM of the UE was previously connected to the respective network and established a successful CS voice call using the network. The RAT ID illustrates whether the network is a 2G network or a 3G network.

For example, consider an entry with SI number 1 from the RAT information table 400. The SI number 1 includes LAI ID value "310 380 00 01," indicating the location and area information of the network. The entry further includes SIM number 1, indicating that SIM number 1 of the UE was connected to the network and established a successful CS voice call using the network. Further, the entry includes RAT ID 2G, indicating that the network is a 2G network.

Consider another illustration from the RAT information table 400 with entry SI number 4. The SI number 4 includes LAI ID value "310 410 00 02," indicating the location and area information of the network. The entry further includes SIM number 4, indicating that that SIM number 4 of the UE was connected to the network and established a successful CS voice call using the network. Further, the entry includes RAT ID 3G, indicating that the network is a 3G network.

The UE includes a single RAT information table 400, where the table 400 can be accessed by each of the SIMs of the UE before attempting to establish a connection with the network. For example, S1 number 1 in the table 400 was previously updated by SIM number 1 of the UE. Then, the table 400 can be accessed by the UE when SIM number 2 wishes to make a CS voice call. The table 400 allows the multiple SIMs to identify a suitable network that can allow the UE to establish a CS voice call over the network without additional delay, and thereby reducing power consumption versus searching for a suitable network.

Figure 5:
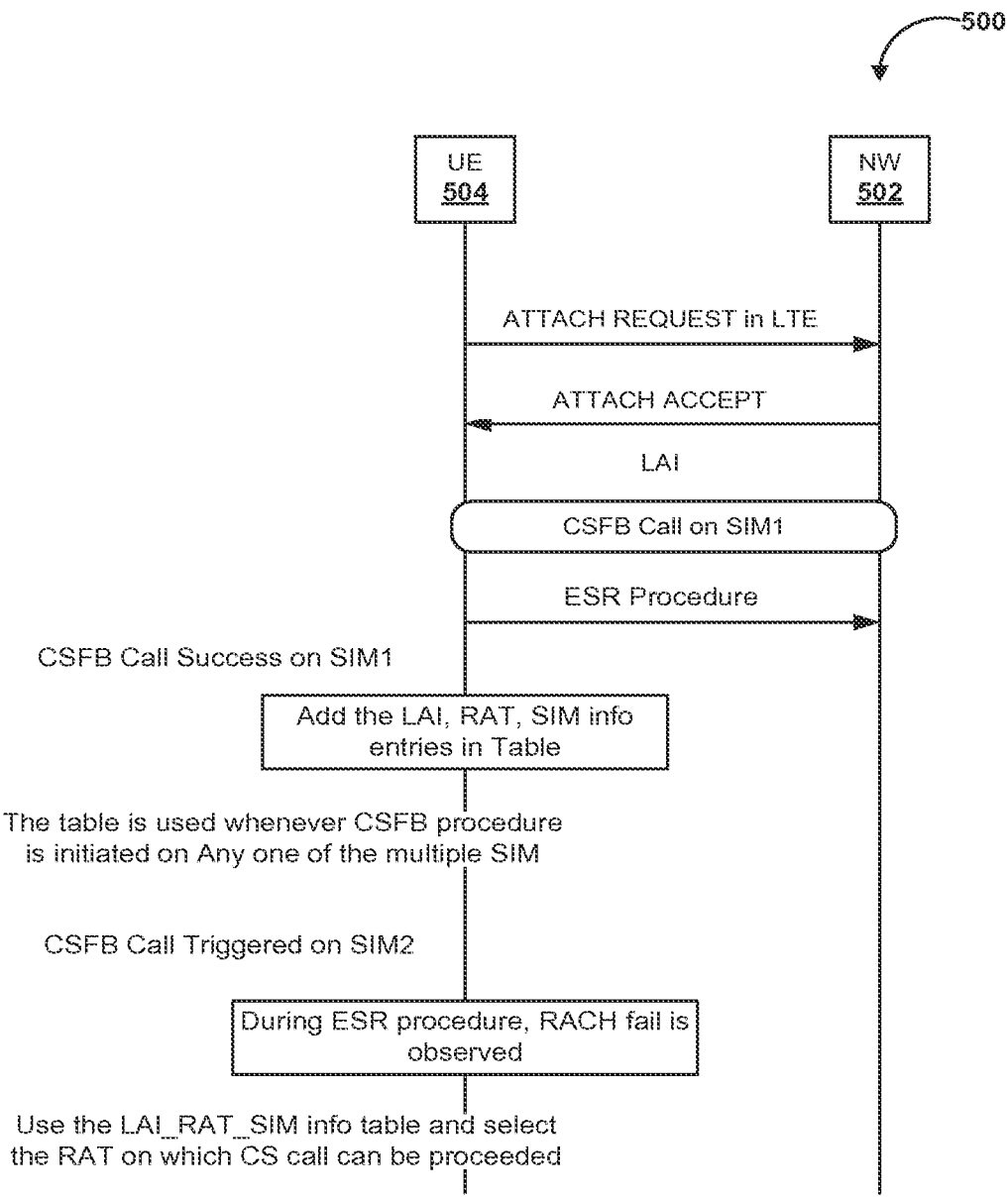
FIG. 5 is a flowchart of a method of reducing delay in CSFB in a RAT communications network, according to an embodiment of the present disclosure.

FIG. 5 is a flowchart of a method of reducing delay in CSFB in a RAT communications network, according to an embodiment of the present disclosure.

Referring to FIG. 5, interaction between UE 504 and a network 502 is disclosed. The UE 504 sends an Attach Request message to the network 502 in LTE. The network 502 identifies the request from the UE 504 and sends an Attach Accept message to the UE 504 along with LAI information. SIM number 1 of the UE 504 uses the LAI information and identifies the suitable network to establish a CSFB call.

Upon successful CSFB call establishment on SIM number 1, the UE 504 makes an Extended Service Request (ESR) of the network 502 and adds the LAI information, RAT information, and the SIM information to the RAT information table 400, as described above with respect to FIG. 4. The table 400 can be used whenever a CSFB call procedure is initiated on any of the SIMs of the UE 504.

Then, SIM number 2 of the UE 504 wishes to establish a CSFB voice call on the network. However, during an ESR procedure, the UE 504 observes Random Access Channel (RACH) failure indicating that the network is unable to establish the CSFB voice call as the cell is connected to an LTE network. Therefore, the UE 504 can access the RAT information table 400 to obtain LAI information and RAT information related to a suitable network. Upon obtaining information related to a suitable network, the UE 504 establishes a connection with the network and initiates a CSFB voice call. Upon a successful CSFB voice call, the UE 504 updates the LAI information, RAT information, and SIM information in the RAT information table 400.

The present embodiments have been described with reference to certain embodiments. It will be evident that various modifications and changes may be made to these embodiments without departing from the scope and spirit of the present disclosure. Furthermore, the various devices, modules, and the like described herein may be enabled and operated using hardware circuitry, for example, Complementary Metal Oxide Semiconductor (CMOS) based logic circuitry, firmware, software and/or any combination of hardware, firmware, and/or software embodied in a non-transitory machine readable medium. For example, the various electrical structures and methods may be embodied using transistors, logic gates, and electrical circuits, such as an Application Specific Integrated Circuit (ASIC).

While the present disclosure has been shown and described with reference to certain embodiments thereof, it will be understood by those of ordinary skill in the art that various changes in form and details may be made therein without departing from the scope and spirit of the present disclosure, as defined by the appended claims and their equivalents.

What is claimed is:

1. A method of reducing delay in Circuit Switched FallBack (CSFB) in a Radio Access Technology (RAT) communications network, the method comprising:
   initiating, by a terminal, a combined attach procedure by sending an attach request message to the RAT communications network;
   receiving, by the terminal, an attach accept message along with Location Area Identification (LAI) information from the network in response to the attach request message;
   checking, by the terminal, network identifier information in a RAT information table based on the received LAI; and
   selecting a mobile network based on the network identifier information to trigger establishment of a circuit-switched call.

2. The method of claim 1, further comprising:
   selecting, by the terminal, an available network in 2G or 3G to reside on, if the terminal fails to identify the selected mobile network based on the network identifier information.

3. The method of claim 1, wherein the network identifier information comprises at least one of:
   mobile network operator information; and
   LAI corresponding to the selected mobile network.

4. The method of claim 1, wherein the RAT Information table comprises an LAI value, SIM information, and RAT information, wherein the RAT information is based on 2G/3G information.

5. The method of claim 1, further comprising:
   updating, by the terminal, the RAT information table with LAI information and RAT information when a CSFB call is successful on the selected mobile network.

6. The method of claim 1, wherein the terminal selects the mobile network during at least one of:
   a CSFB call initiation;
   a network failure; and
   an improved network service.

7. The method of claim 1, wherein the RAT information table is accessed by one or more of Subscriber Identity Modules (SIMs) in the terminal corresponding to one or more mobile network operators.

8. A terminal configured to establish a Circuit Switched FallBack (CSFB) call, comprising at least one module configured to:
   initiate a combined attach procedure by sending an attach request message to a network;
   receive an attach accept message along with Location Area Identification (LAI) information from the network in response to the attach request message;
   check network identifier information in a RAT information table based on the received LAI; and
   select a mobile network based on the network identifier information to trigger establishment of a circuit-switched call connection.

9. The terminal of claim 8, further comprising at least one module configured to:
   select an available network in 2G or 3G to reside on if the terminal fails to identify the selected mobile network based on the network identifier information.

10. The terminal of claim 8, wherein the network identifier information comprises at least one of:
    mobile network operator information; and
    LAI corresponding to the selected mobile network.

11. The terminal of claim 8, wherein the RAT Information table comprises an LAI value, SIM information, and RAT information, wherein the RAT information is based on 2G/3G information.

12. The terminal of claim 8, further comprising at least one module configured to:
    update the RAT information table with LAI information and RAT information when a CSFB call is successful on the selected mobile network.

13. A chip set for reducing delay in Circuit Switched FallBack (CSFB) in a Radio Access Technology (RAT) communications network configured to:
    initiate a combined attach procedure by sending an attach request message to the RAT communications network;
    receive an attach accept message along with Location Area Identification (LAI) information from the network in response to the attach request message;
    check network identifier information in a RAT information table based on the received LAI; and
    select a mobile network based on the network identifier information to trigger establishment of a circuit-switched call.

14. The chip set of claim 13, further configured to:
    select an available network in 2G or 3G to reside on, if the selected mobile network based on the network identifier information is not identified.

15. The chip set of claim 13, wherein the network identifier information comprises at least one of
    mobile network operator information; and
    LAI corresponding to the selected mobile network.

16. The chip set of claim 13, wherein the RAT Information table comprises an LAI value, SIM information, and RAT information, wherein the RAT information is based on 2G/3G information.

17. The chip set of claim 13, further configured to:
    update the RAT information table with LAI information and RAT information when a CSFB call is successful on the selected mobile network.

18. The chip set of claim 13, wherein the mobile network is selected during at least one of:
    a CSFB call initiation;
    a network failure; and
    an improved network service.

19. The chip set of claim 13, wherein the RAT information table is accessed by one or more of Subscriber Identity Modules (SIMs) corresponding to one or more mobile network operators.

* * * * *